June 4, 1963   G. D. GOSWICK   3,092,078
POULTRY WATER FOUNTAIN
Filed Nov. 15, 1961
*Fig. 1*
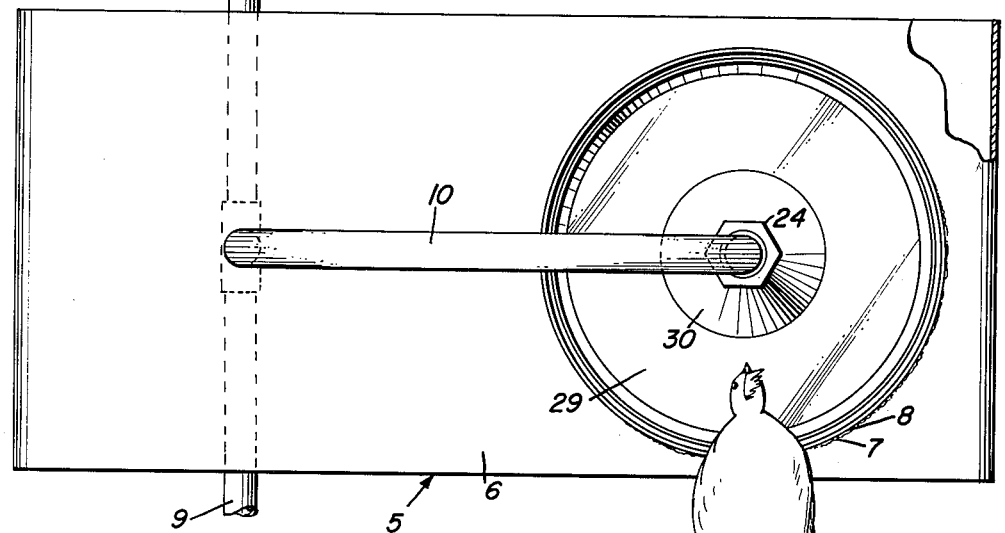
*Fig. 3*
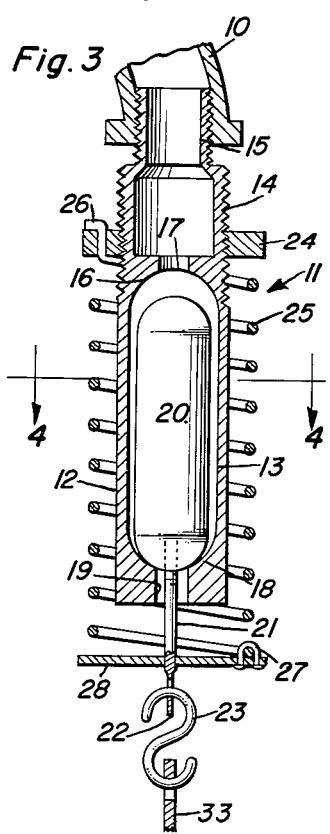
*Fig. 4*
*Fig. 2*
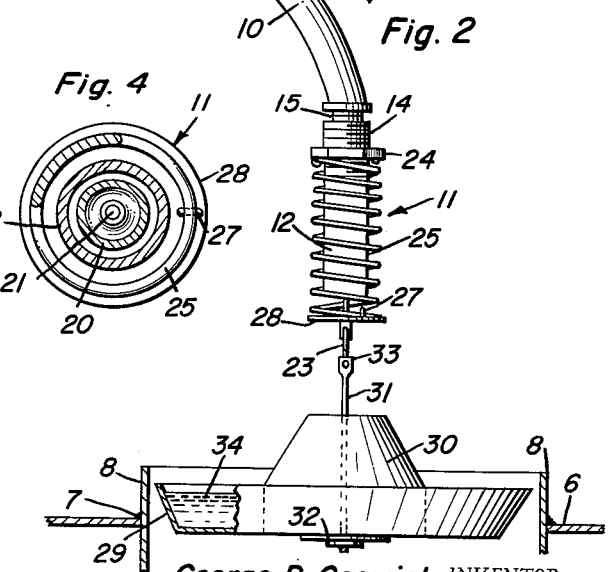
George D. Goswick INVENTOR.
BY

United States Patent Office 3,092,078
Patented June 4, 1963

3,092,078
POULTRY WATER FOUNTAIN
George D. Goswick, Rte. 1, Box 240, Alpharetta, Ga.
Filed Nov. 15, 1961, Ser. No. 152,530
3 Claims. (Cl. 119—81)

This invention relates to new and useful improvements in water fountains particularly, although not necessarily, for poultry and has for its primary object to provide, in a manner as hereinafter set forth, a device of this character wherein the weight of the water is utilized for controlling the supply thereof for maintaining a substantially constant or uniform water level in the pan or other receptacle.

Another highly important object of the present invention is to provide an automatic poultry fountain of the aforementioned character comprising an improved control valve of unique construction.

Still another very important object of the invention is to provide an automatic poultry waterer or fountain of the character described wherein the improved control valve is readily adjustable to vary the level of the water to be maintained as may be desired.

Other objects of the invention are to provide an automatic poultry water fountain which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a top plan view of an automatic poultry water fountain constructed in accordance with the present invention, a portion of the platform being broken away in section;

FIGURE 2 is a view principally in side elevation of the device without the platform;

FIGURE 3 is an enlarged vertical sectional view through the valve; and

FIGURE 4 is a view in horizontal section, taken substantially on the line 4—4 of FIGURE 3.

Referring now to the drawing in detail, it will be seen that the embodiment of the invention which has been illustrated comprises an elongated, substantially rectangular hollow vase or platform of suitable material, preferably metal, which is designated generally by reference character 5. The top or deck 6 of the platform 5, which may also be of any desired dimensions, has formed therein adjacent one end thereof a circular opening 7 in which a cylindrical ring 8 is mounted.

Mounted transversely on the platform 5 beneath the top 6 thereof and extending through the side walls of said platform is a water pipe 9 from a suitable source of supply. Mounted on the water pipe 9 in communication therewith and extending upwardly therefrom through the top 6 of the platform 5 is a water pipe 10 in the form of a tubular gooseneck. Removably mounted on the outlet end of the gooseneck 10 and depending therefrom is a control valve 11.

As illustrated to advantage in FIGURE 3 of the drawing, the control valve 11 comprises, in the embodiment shown, a vertically elongated cylindrical body 12 having therein a vertically elongated chamber 13. The upper portion of the body 12 is externally threaded, as at 14. The body 12 further includes a reduced, externally threaded upstanding neck 15 on the upper end of said body 12, which neck is screwed into the outlet end portion of the gooseneck 10 for removably mounting the valve 11 thereon. The upper end wall of the chamber 13 is rounded in a manner to provide a seat 16 which defines inlet opening 17. The lower end portion of the body 12 is formed to provide a rounded seat 18 in the lower end of the chamber 13, an outlet opening 19 extending downwardly from said seat 18.

An elongated cylindrical valve member 20 of suitable material is operable in the chamber 13 and engageable with the seat 18 for closing the outlet opening 19. The seat 16 functions as a stop for the valve member 20. Affixed to the lower end portion of the valve member 20 and depending therefrom through the outlet opening 19 is a stem 21. The stem 21 includes a flattened, apertured lower end portion 22 from which an S-hook 23 is suspended.

Threaded for adjustment on the portion 14 of the body 12 is a nut or the like 24. A coil spring 25 encircles the valve body 12 and is suspended from the nut 24, being secured thereto at 26. The spring 25 extends downwardly beyond the lower end of the body 12 and has its lower end secured as at 27 to a disk or the like 28 which is fixed on the lower portion of the stem 21. It will be noted that the end portions of the valve member 20 are rounded to conform substantially to the seats 16 and 18.

Suspended from the S-hook 23 is a circular pan or other suitable receptacle 29. Mounted centrally in the pan 29 is a hood or the like 30. A suspension rod or hanger 31 extends downwardly through the hood 30 through the bottom of the pan 29 and is anchored thereto as at 32. The rod 31 includes a flattened, apertured upper end portion 33 in which the hook 23 is engaged.

It is thought that the operation of the device will be readily apparent from a consideration of the foregoing. Briefly, the pan 29 with a supply of water therein, as indicated at 34, is yieldingly suspended from the gooseneck 10, said pan being movable vertically in the cylindrical ring 8 in the platform 5 which functions as a guide for said pan and retains the same against swinging movement. When the water 34 in the pan 29 is at the desired level, the weight is sufficient to seat the valve member 20 at 18 against the tension of the spring 25 thus shutting off the flow from the supply pipe 9. However, as the water 34 in the pan diminishes and the weight decreases, said pan is elevated by the spring 25 thus unseating the valve member 20 for allowing the water in said pan to be returned to the desired level. This level of the water in the pan 29 may be regulated as desired in an obvious manner by adjusting the nut 24 on the upper portion 14 of the valve body 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A poultry water fountain comprising a water pipe including a downwardly directed discharge end, a control valve including a body mounted on the discharge end of said pipe and depending therefrom, said body having a chamber therein communicating with the water pipe for receiving water therefrom, said body including a valve seat in its lower end portion defining a water outlet opening communicating with the chamber, a valve member operable in the chamber and engageable with the seat for controlling the opening, a stem depending from the valve member, a pan suspended from said stem for receiving water from the valve and closing same by gravity, and resilient means for yieldingly resisting closing of the valve and for opening same, said means comprising a connecting member fixed on the stem, a coil spring encircling the body and having one end attached to said connecting member, and means adjustably connecting the other end of the spring to the body.

2. A poultry water fountain in accordance with claim 1, the last-named means including a nut threaded on the body, said other end of said spring being anchored to said nut.

3. The combination of claim 1, said fountain further comprising a ring encircling the pan in spaced, concentric relation thereto whereby swinging movement of said pan will be limited.

References Cited in the file of this patent

UNITED STATES PATENTS

| | | |
|---|---|---|
| 1,764,835 | Geer | June 17, 1930 |
| 2,295,964 | Null | Sept. 15, 1942 |
| 2,626,630 | Hotton | Jan. 27, 1953 |
| 2,651,321 | McBride | Sept. 8, 1953 |
| 2,669,220 | Goff | Feb. 16, 1954 |
| 2,752,935 | Keyser | July 3, 1956 |

OTHER REFERENCES

Germany, K16799–111/45h, Sept. 13, 1956.